US008762033B2

(12) United States Patent

Tanaka et al.

(10) Patent No.: US 8,762,033 B2

(45) Date of Patent: Jun. 24, 2014

(54) INTERNAL COMBUSTION ENGINE CONTROL DEVICE

(75) Inventors: Hiroyuki Tanaka, Susono (JP); Kaoru Ohtsuka, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 847 days.

(21) Appl. No.: 12/738,455

(22) PCT Filed: Dec. 1, 2008

(86) PCT No.: PCT/JP2008/072213

§ 371 (c)(1), (2), (4) Date: Apr. 16, 2010

(87) PCT Pub. No.: WO2009/087843

PCT Pub. Date: Jul. 16, 2009

(65) Prior Publication Data

US 2010/0269785 A1 Oct. 28, 2010

(30) Foreign Application Priority Data

Jan. 9, 2008 (JP) ................................ 2008-002538

(51) Int. Cl.

*G06F 19/00* (2011.01)
*G06G 7/70* (2006.01)
*F02D 41/12* (2006.01)
*F02P 5/00* (2006.01)

(52) U.S. Cl.

CPC ............ *F02D 41/126* (2013.01); *F04D 41/123* (2013.01); *F04D 31/007* (2013.01)
USPC ....................... 701/110; 123/325; 123/406.25

(58) Field of Classification Search

CPC ....... F02D 41/10; F02D 41/12; F02D 41/107; F02D 41/123; F02D 41/126; F02D 31/00; F02D 31/001; F02D 31/007
USPC ................ 123/198 DB, 325, 332, 333, 339.1, 123/339.16, 481, 406.16, 406.21, 406.23, 123/406.25, 406.47, 493, 339.14; 701/102–104, 110, 112
See application file for complete search history.

(56) References Cited

U.S. PATENT DOCUMENTS 6,615,797 B2 * 9/2003 Richard et al. ................ 123/352
7,295,915 B1 * 11/2007 Okubo et al. ................. 701/110

(Continued)

FOREIGN PATENT DOCUMENTS

DE 101 54 974 A1 5/2003
DE 103 34 401 B3 11/2004

(Continued)

OTHER PUBLICATIONS

International Search Report mailed on Mar. 23, 2009 in corresponding International Application No. PCT/JP2008/072213.

(Continued)

*Primary Examiner* — Hieu T Vo
*Assistant Examiner* — Sherman Manley
(74) *Attorney, Agent, or Firm* — Oliff PLC

(57) ABSTRACT

When fuel cut permission conditions are satisfied, a guard provided by an ignition timing retardation limit is relieved. In the resulting state, the ignition timing is retarded to decrease the output torque of an internal combustion engine. After the output torque of the internal combustion engine is decreased to a predetermined minimum torque, the supply of fuel is shut off. When, on the other hand, recovery from a fuel cut is to be achieved, the guard provided by the ignition timing retardation limit is relieved until completion conditions for recovery from the fuel cut are satisfied. In the resulting state, the ignition timing is retarded to decrease the output torque of the internal combustion engine.

10 Claims, 6 Drawing Sheets

(56) References Cited

U.S. PATENT DOCUMENTS

| | | | | |
|---|---|---|---|---|
| 7,367,322 | B2 * | 5/2008 | Miyata et al. | 123/481 |
| 7,383,813 | B2 * | 6/2008 | Weiss et al. | 123/325 |
| 7,481,039 | B2 * | 1/2009 | Surnilla et al. | 60/274 |
| 7,643,929 | B2 * | 1/2010 | Stroh | 701/103 |
| 2002/0050269 | A1 * | 5/2002 | Osanai | 123/339.11 |
| 2002/0133281 | A1 * | 9/2002 | Kotwicki et al. | 701/54 |
| 2006/0183598 | A1 * | 8/2006 | Ito et al. | 477/107 |
| 2006/0231068 | A1 * | 10/2006 | Weiss et al. | 123/325 |

FOREIGN PATENT DOCUMENTS

| | | |
|---|---|---|
| EP | 0 241 008 A2 | 10/1987 |
| JP | A-8-246938 | 9/1996 |

OTHER PUBLICATIONS

Written Opinion of the International Searching Authority mailed on Mar. 23, 2009 in corresponding International Application No. PCT/JP2008/072213.

* cited by examiner

INTERNAL COMBUSTION ENGINE CONTROL DEVICE

TECHNICAL FIELD

The present invention relates to a control device for an internal combustion engine, and more particularly to a control device that exercises ignition timing retardation control to reduce the output torque of the internal combustion engine before a fuel-cut and when recovery from a fuel-cut state is to be achieved.

BACKGROUND ART

When a vehicle coasts, a fuel cut is conventionally performed to shut off the supply of fuel to an internal combustion engine. Performing a fuel cut makes it possible to reduce extra fuel consumption. However, when a fuel cut is performed, the torque (indicated torque) output from the internal combustion engine exhibits a stepwise decrease to zero. Such a stepwise torque change may cause a shock depending on the magnitude of an output torque generated immediately before the fuel cut.

A method for alleviating a shock caused by a fuel cut is described in JP-A-1996-246938. This method first reduces the output torque by retarding the ignition timing before shutting off the supply of fuel, and then shuts off the supply of fuel. Further, this method retards the ignition timing until the resulting retardation amount reaches a critical retardation amount.

The aforementioned critical retardation amount is the limit of a retardation amount range where the combustion in an internal combustion engine is maintainable. If a misfire is to be ignored, the ignition timing can be retarded beyond such a limit. When the ignition timing is to be retarded while ignoring a misfire, the torque can be reduced to the minimum torque that can be output from the internal combustion engine. However, the conventional technology described above cannot retard the ignition timing beyond the critical retardation amount because it performs a guarding function for the ignition timing retardation amount. In other words, the output torque obtained immediately before a fuel cut is equal to the torque provided by the critical retardation amount.

The torque provided by the critical retardation amount is higher than the internal combustion engine's minimum torque, which is provided irrespective of misfiring. Accordingly, a great torque change occurs when a fuel cut is performed during the use of the torque provided by the critical retardation amount. To further suppress the shock by reducing such a torque change, it is necessary to permit ignition timing retardation beyond the critical retardation amount and reduce the output torque prevailing immediately before a fuel cut to the internal combustion engine's minimum torque. However, if the ignition timing is merely left unguarded, proper combustion cannot be assured during a normal operation. This will cause another problem such as the generation of a misfire-induced torque shock.

The above problem concerning an abrupt torque change brought about by a fuel cut also applies to the recovery from a fuel cut. When recovery from a fuel cut is achieved, the internal combustion engine generates an output torque stepwise. To suppress the shock by reducing the torque change, it is preferred that the output torque generated upon recovery be minimized. However, if the ignition timing retardation amount is guarded, the output torque generated upon recovery is equal to the torque provided by the critical retardation amount. It means that a torque lower than provided by the critical retardation amount cannot be generated.

DISCLOSURE OF THE INVENTION

The present invention has been made to solve the above problem. An object of the present invention is to provide an internal combustion engine control device that is capable of suppressing the generation of shock due to an abrupt torque change when a fuel cut is performed or when recovery from a fuel cut is achieved.

According to a first aspect of the present invention, the internal combustion engine control device includes guard means, judgment means, relief means, torque control means and fuel supply shutoff means. The guard means guards the ignition timing by the retardation limit of a ignition timing range where the combustion in an internal combustion engine is maintainable. The judgment means judges whether fuel cut permission conditions are satisfied. The relief means relieves the ignition timing guard provided by the guard means when the fuel cut permission conditions are satisfied. The torque control means reduces the output torque of the internal combustion engine by retarding the ignition timing after the fuel cut permission conditions are satisfied. The fuel supply shutoff means shuts off the supply of fuel after the output torque of the internal combustion engine is reduced to a predefined minimum torque.

The first aspect of the present invention relieves the ignition timing guard when the fuel cut permission conditions are satisfied. Therefore, the ignition timing can be retarded beyond the retardation limit to make the internal combustion engine's output torque lower than a combustion limit. Further, the generation of torque-change-induced shock can be suppressed by shutting off the supply of fuel after reducing the internal combustion engine's output torque to the minimum torque.

After the ignition timing guard is relieved, a misfire may occur because the ignition timing can be retarded beyond the retardation limit. However, the output torque is sufficiently suppressed at the time of misfiring. Therefore, even if a misfire occurs, the resulting torque change does not cause a significant shock. Further, the ignition timing guard is relieved after the fuel cut permission conditions are satisfied. During a normal operation, therefore, the ignition timing guard is provided by the retardation limit to ensure that the combustion in the internal combustion engine is properly maintained.

A preferred torque control means according to the first aspect of the present invention includes target torque setup means, intake air amount control means, estimated torque calculation means, torque efficiency calculation means, ignition retardation amount setup means and ignition timing control means. The target torque setup means serves as means for setting a target torque for the internal combustion engine and, after the fuel cut permission conditions are satisfied, reduces the target torque to the minimum torque. The intake air amount control means controls the operation amount of an intake actuator, which adjusts the intake air amount of the internal combustion engine, in accordance with the target torque. The estimated torque calculation means calculates an estimated torque that is obtained when the ignition timing is adjusted for MBT without changing the current operation amount of the intake actuator. The torque efficiency calculation means calculates torque efficiency from the ratio between the target torque and the estimated torque. The ignition retardation amount setup means stets a retardation amount for the ignition timing in accordance with the torque efficiency. The ignition timing control means controls the ignition timing in accordance with the retardation amount.

According to the preferred torque control means, when the target torque is reduced to the minimum torque after the fuel cut permission conditions are satisfied, the operation amount of the intake actuator is adjusted to provide the target torque, thereby retarding the ignition timing to compensate for the difference between the torque provided by the intake air amount and the target torque. This automatically decreases the intake air amount and retards the ignition timing, thereby making it possible to reduce the output torque to a limit at which the internal combustion engine can generate torque.

A preferred target torque setup means according to the first aspect of the present invention includes requested output torque acquisition means, pre-fuel-cut torque request means, and mediation means. The requested output torque acquisition means acquires an output torque that a consumption element, which consumes the torque of the internal combustion engine, requests the internal combustion engine to generate. The pre-fuel-cut torque request means serves as request means for expressing a request concerning a pre-fuel-cut operating state in terms of a torque value, requests a value beyond an achievable torque range as a pre-fuel-cut torque when the fuel cut permission conditions are not satisfied, and gradually reduces the pre-fuel-cut torque from an output torque requested when the fuel cut permission conditions are satisfied to the minimum torque after the fuel cut permission conditions are satisfied. The mediation means compares the requested output torque and the pre-fuel-cut torque and selects the lower of the two torques as a target torque.

According to the preferred target torque setup means, a request concerning a pre-fuel-cut operating state is expressed in terms of a torque value and mediated with a requested output torque. Then, a torque determined by mediation is set as a target torque. This makes it possible to provide continuous torque control before and after a fuel cut. Further, after the fuel cut permission conditions are satisfied, the pre-fuel-cut torque is gradually reduced from the output torque requested when the fuel cut permission conditions are satisfied to the minimum torque. This makes it possible to avoid an abrupt torque change that may be caused by the satisfaction of fuel cut permission conditions.

A preferred requested output torque acquisition means according to the first aspect of the present invention acquires the sum of an axial torque requested by a driver and an accessory load torque necessary for accessory drive as the requested output torque.

According to the preferred requested output torque acquisition means, the accessory load torque necessary for accessory drive can be included in the requested output torque to avoid an abrupt torque change when torque is consumed for accessory drive before a fuel cut.

A preferred judgment means according to the first aspect of the present invention judges that the fuel cut permission conditions are satisfied when the value of the axial torque requested by the driver is zero.

According to the preferred judgment means, as far as the fuel cut permission conditions are satisfied when the axial torque requested by the driver is zero, torque reduction for a fuel cut can be initiated as early as possible without affecting drivability. This makes it possible to perform a fuel cut promptly and reduce extra fuel consumption accordingly.

A preferred fuel supply shutoff means according to the first aspect of the present invention measures the elapsed time from the instant at which the fuel cut permission conditions are satisfied, and when the elapsed time reaches a predetermined time limit, shuts off the supply of fuel even if the output torque of the internal combustion engine is not reduced to the minimum torque.

According to the preferred fuel supply shutoff means, when the elapsed time from the instant at which the fuel cut permission conditions are satisfied reaches a predetermined time limit, the supply of fuel is forcibly shut off. Therefore, a fuel cut can be properly performed even when the output torque of the internal combustion engine is not reduced to the minimum torque because of torque control variation.

Alternatively, according to a second aspect of the present invention, the internal combustion engine control device includes guard means, torque control means, judgment means and relief means. The guard means guards the ignition timing by the retardation limit of a ignition timing range where the combustion in an internal combustion engine is maintainable. The torque control means retards the ignition timing to reduce the output torque of the internal combustion engine when recovery from a fuel-cut state is to be achieved. The judgment means judges whether completion conditions for recovery from the fuel cut state are satisfied. The relief means relieves the ignition timing guard provided by the guard means until the fuel cut recovery completion conditions are satisfied.

When recovery from a fuel cut is achieved, the second aspect of the present invention relieves the ignition timing guard. Therefore, the ignition timing can be retarded beyond the retardation limit to make the internal combustion engine's output torque lower than the combustion limit. This makes it possible to reduce an abrupt torque change that occurs when torque is generated upon recovery from a fuel cut, and suppress the generation of torque-change-induced shock.

When the ignition timing is retarded beyond the retardation limit, a misfire may result from combustion maintenance failure. However, the recovery from a fuel cut is achieved while the output torque is sufficiently reduced. Therefore, the shock caused by an abrupt torque change is insignificant even if a misfire occurs. Further, the ignition timing guard becomes active upon recovery from a fuel cut. Consequently, when a normal operation is conducted after recovery from a fuel cut, the combustion in the internal combustion engine can be properly maintained due to the guard provided by the retardation limit.

A preferred torque control means according to the second aspect of the present invention includes target torque setup means, intake air amount control means, estimated torque calculation means, torque efficiency calculation means, ignition retardation amount setup means and ignition timing control means. The target torque setup means serves as means for setting a target torque for the internal combustion engine and gradually increases the target torque from a value below a combustion limit when recovery from a fuel-cut state is to be achieved. The intake air amount control means controls the operation amount of an intake actuator, which adjusts the intake air amount of the internal combustion engine, in accordance with the target torque. The estimated torque calculation means calculates an estimated torque that is obtained when the ignition timing is adjusted for MBT without changing the current operation amount of the intake actuator. The torque efficiency calculation means calculates torque efficiency from the ratio between the target torque and the estimated torque. The ignition retardation amount setup means sets a retardation amount for the ignition timing in accordance with the torque efficiency. The ignition timing control means controls the ignition timing in accordance with the retardation amount.

according to the preferred torque control means, when the target torque is set to be lower than the combustion limit upon recovery from a fuel cut, the amount of intake actuator operation is adjusted to achieve the target torque, and the ignition timing is retarded to compensate for the difference between the torque provided by the intake air amount and the target torque. This automatically decreases the intake air amount and retards the ignition timing, thereby making it possible to reduce the output torque to a limit at which the internal combustion engine can generate torque.

A preferred target torque setup means according to the second aspect of the present invention includes requested output torque acquisition means, fuel-cut recovery torque request means and mediation means. The requested output torque acquisition means acquires an output torque that a consumption element, which consumes the torque of the internal combustion engine, requests the internal combustion engine to generate. The fuel-cut recovery torque request means serves as request means for expressing a request concerning an operating state prevailing upon recovery from a fuel-cut state in terms of a torque value, requests a value beyond an achievable torque range as a fuel-cut recovery torque when the fuel cut recovery completion conditions are satisfied, and gradually brings the fuel-cut recovery torque close to the requested output torque from a value below the combustion limit until the fuel cut recovery completion conditions are satisfied. The mediation means compares the requested output torque and the fuel-cut recovery torque and selects the lower of the two torques as a target torque.

According to the preferred target torque setup means, a request concerning an operating state prevailing upon recovery from a fuel-cut state is expressed in terms of a torque value and mediated with a requested output torque. Then a torque determined by mediation is set as a target torque. This makes it possible to provide continuous torque control before and after a fuel cut. Further, the fuel-cut recovery torque can be gradually brought close to the requested output torque from a value below the combustion limit until the fuel cut recovery completion conditions are satisfied. This makes it possible to suppress an abrupt torque change that may be caused by the satisfaction of fuel cut recovery completion conditions.

A preferred requested output torque acquisition means according to the second aspect of the present invention acquires the sum of an axial torque requested by a driver and an accessory load torque necessary for accessory drive as the requested output torque.

According to the preferred requested output torque acquisition means, when, for instance, recovery from a fuel cut is to be achieved in accordance with an axial torque request from the driver, the internal combustion engine's output torque can be smoothly increased as needed to provide the axial torque requested by the driver and the accessory load torque without causing an abrupt torque change during such an output torque increase. Further, when recovery from a fuel cut is achieved, it is possible to avoid an abrupt torque change that may be caused by torque consumption for accessory drive.

Another preferred requested output torque acquisition means according to the second aspect of the present invention acquires a torque necessary for idling the internal combustion engine as the requested output torque.

According to the another preferred requested output torque acquisition means, when, for instance, a lock-up feature is deactivated to achieve recovery from a fuel cut, the internal combustion engine's output torque can be smoothly increased as needed to provide torque necessary for idling the internal combustion engine without causing an abrupt torque change during such an output torque increase.

A preferred judgment means according to the second aspect of the present invention judges that the fuel cut recovery completion conditions are satisfied when the difference between the requested output torque and the fuel cut recovery torque is reduced to a predetermined value or smaller.

According to the judgment means, when the difference between the requested output torque and the fuel cut recovery torque is reduced to a predetermined value or smaller, it is judged that the fuel cut recovery completion conditions are satisfied. This makes it possible to avoid an abrupt torque change that may be caused by the satisfaction of fuel cut recovery completion conditions.

BEST MODE FOR CARRYING OUT THE INVENTION

First Embodiment

A first embodiment of the present invention will now be described with reference to FIGS. 1 to 11.

Figure 1:
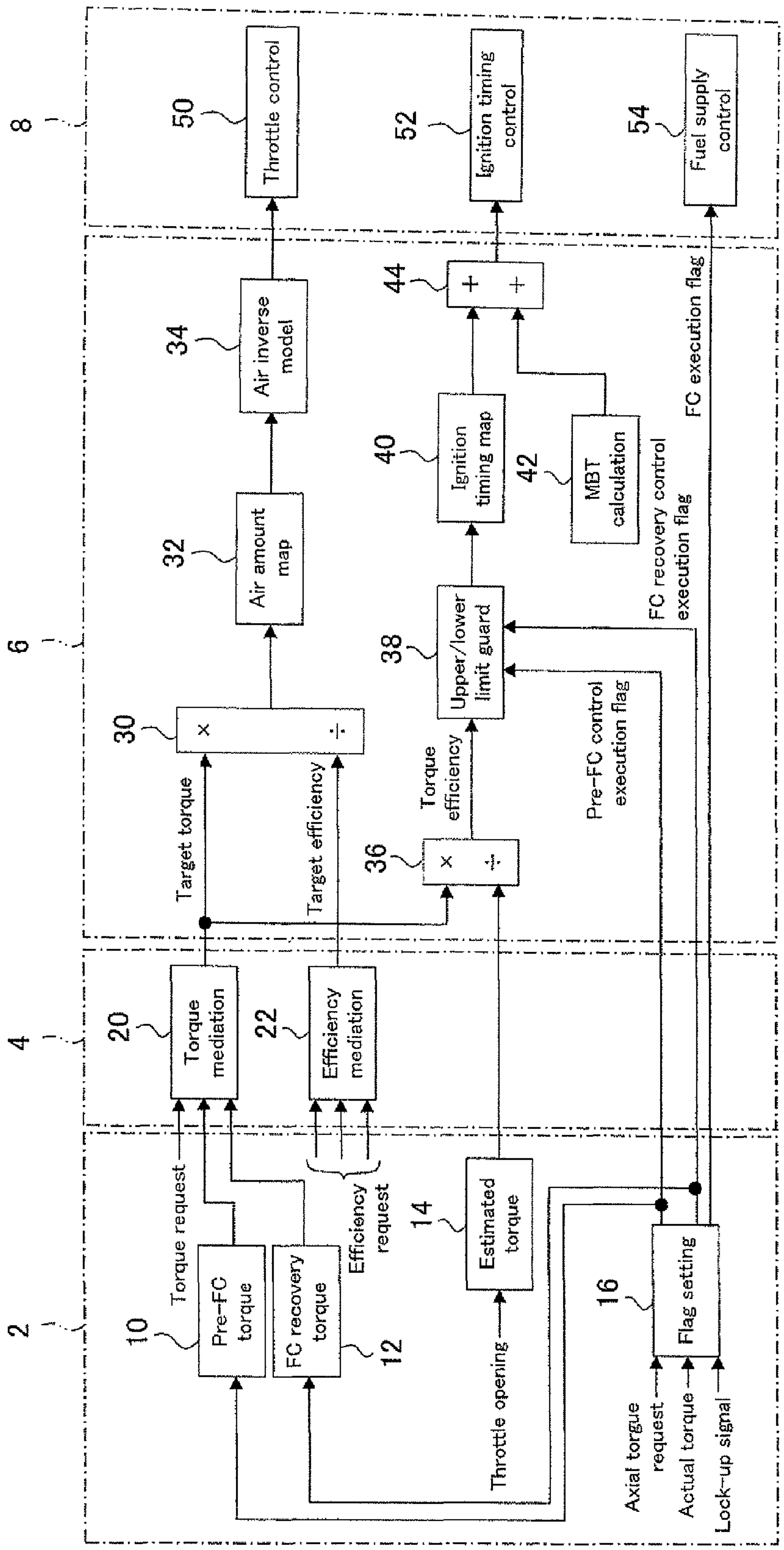
FIG. 1 is a block diagram illustrating the configuration of an internal combustion engine control device according to a first embodiment of the present invention.

FIG. 1 is a block diagram illustrating the configuration of an internal combustion engine control device according to the first embodiment of the present invention. The control device according to the present embodiment is applied to a spark ignition internal combustion engine and configured as a control device for controlling the operations of a throttle, an ignition device, and a fuel supply device, which serve as actuators for the spark ignition internal combustion engine. The configuration of the control device according to the present embodiment will be described below with reference to FIG. 1. The internal combustion engine will be hereinafter simply referred to as the engine.

As shown in FIG. 1, the control device according to the present embodiment includes an information supply section 2, a request mediation section 4, a controlled variable calculation section 6, and an actuator control section 8. Basically, signals unidirectionally flow between these sections 2, 4, 6, 8. More specifically, the signals are conveyed from the information supply section 2 to the actuator control section 8. The throttle, ignition device, and fuel supply device, which serve as actuators for the engine, are connected to the actuator control section 8, which is at the most downstream end.

The information supply section 2, which is at the most upstream end, supplies the information about the operating status of the engine and various requests made to the engine to the request mediation section 4 and the controlled variable calculation section 6, which are positioned downstream. The information about the operating status of the engine includes, for instance, an engine rotation speed, an air flow meter output value, a throttle opening sensor output value, an ignition timing setting, an air-fuel ratio setting, and valve timing. Such information is derived from various sensors mounted in the engine. FIG. 1 shows only a throttle opening, which is one of the above-mentioned items of information and particularly relevant to the present invention.

The information supply section 2 is also capable of estimating the operating status of the engine. One of the functions of the information supply section 2 is performed by an estimated torque calculation section 14, which performs calculations to estimate the torque of the engine. The estimated torque calculation section 14 uses an air intake system's air model to calculate an anticipated air amount from the current throttle opening. As for an air model, the air flow meter output value, valve timing, intake air temperature, and other air amount conditions can be considered. The anticipated air amount calculated by using an air model is then put into a torque map. The torque map is used to convert the anticipated air amount to a torque. The torque map is a multidimensional map based on a plurality of parameters such as the anticipated air amount. The ignition timing, engine rotation speed, air-fuel ratio, valve timing, and various other operating conditions having influence on torque can be set as the parameters. Values (current values) derived from the current operating status information are input as the parameters. However, it is assumed that the ignition timing is adjusted for MBT. The estimated torque calculation section 14 calculates a torque that prevails when the ignition timing is adjusted for MBT, and outputs the calculated torque to a later-described torque efficiency calculation section 36 as an estimated torque of the engine.

Further, the information supply section 2 is capable of transmitting the information about the operating status of the engine. The transmitted information indicates whether or not to perform a fuel cut, exercise pre-fuel-cut control, and exercise control upon recovery from a fuel-cut state. Pre-fuel-cut control (hereinafter referred to as pre-FC control) is engine control that is exercised to minimize the torque change caused by a fuel cut. Control to be exercised upon recovery from a fuel cut (hereinafter referred to as FC recovery control) is engine control that is exercised to minimize the torque change caused by the recovery from a fuel cut. A flag set section 16 not only judges whether or not to perform a fuel cut, but also judges whether or not to perform the above control functions. The flag set section 16 turns on or off a flag to transmit the results of the above judgments. A pre-FC control execution flag turns on or off to indicate whether or not to exercise pre-FC control. An FC recovery control execution flag turns on or off to indicate whether or not to exercise FC recovery control. An FC execution flag turns on or off to indicate whether or not to perform a fuel cut.

Requests to the engine, which are generated from the information supply section 2, will now be described. These requests are related to engine torque or engine efficiency and output as a numerical value. The torque requests include an axial torque request including a request from the driver, a request for torque necessary for accessory drive (hereinafter referred to as an accessory load loss compensation request), and a request for torque necessary for idling (hereinafter referred to as an ISC torque request). The above torque requests also include a request for torque necessary for vehicle control such as VSC (Vehicle Stability Control) and TRC (Traction Control). The efficiency requests are values indicative of requested efficiency with which thermal energy convertible into torque is converted into torque, and are non-dimensional parameters that are to be set with reference to MBT ignition timing. When, for instance, thermal energy is to be used to raise exhaust gas temperature for catalyst warm-up, a value smaller than a reference value of 1 is used as a requested efficiency value. Further, when the ignition timing is to be advanced for torque increase, a value smaller than the reference value of 1 is also used as the requested efficiency value in order to acquire reserve torque beforehand.

The information supply section 2 also includes a pre-FC torque request section 10. The pre-FC torque request section 10 outputs a pre-FC torque request, which is one of the torque requests. The pre-FC torque request uses a torque value to express a request about an operating state prevailing before a fuel cut. In accordance with the on/off status of the pre-FC control execution flag transmitted from the flag set section 16, the pre-FC torque request section 10 changes a setting for the pre-FC torque request to be output. The setting for the pre-FC torque request will be described in detail when pre-FC control is described later.

Further, the information supply section 2 includes an FC recovery torque request section 12. The FC recovery torque request section 12 outputs an FC recovery torque request, which is one of the torque requests. The FC recovery torque request uses a torque value to express a request about an operating state prevailing upon recovery from a fuel cut. In accordance with the on/off status of the FC recovery control execution flag transmitted from the flag set section 16, the FC recovery torque request section 12 changes a setting for the FC recovery torque request to be output. The setting for the FC recovery torque request will be described in detail when FC recovery control is described later.

The request mediation section 4 will now be described. As described above, the information supply section 2 outputs a plurality of requests expressed in terms of torque or efficiency. However, all such requests cannot be simultaneously fulfilled. Even when a plurality of torque requests exist, only one torque request can be fulfilled at a time. Therefore, it is necessary to perform a process for mediating between a plurality of requests. The same holds true for efficiency. The request mediation section 4 includes a torque mediation section 20, which mediates between a plurality of torque requests to obtain one torque value, and an efficiency mediation section 22, which mediates between a plurality of efficiency requests to obtain one efficiency value. The torque mediation section 20 outputs the torque value determined by mediation, as the target torque of the engine, to the controlled variable calculation section 6, which is positioned downstream. The efficiency mediation section 22 outputs the efficiency value determined by mediation, as the target efficiency of the engine, to the controlled variable calculation section 6, which is positioned downstream. Here, mediation is performed to obtain one of a plurality of values in accordance with predetermined calculation rules. The calculation rules include, for instance, rules about maximum value selection, minimum value selection, averaging, and summing. Any appropriate combination of such calculation rules may alternatively be used.

Figure 2:
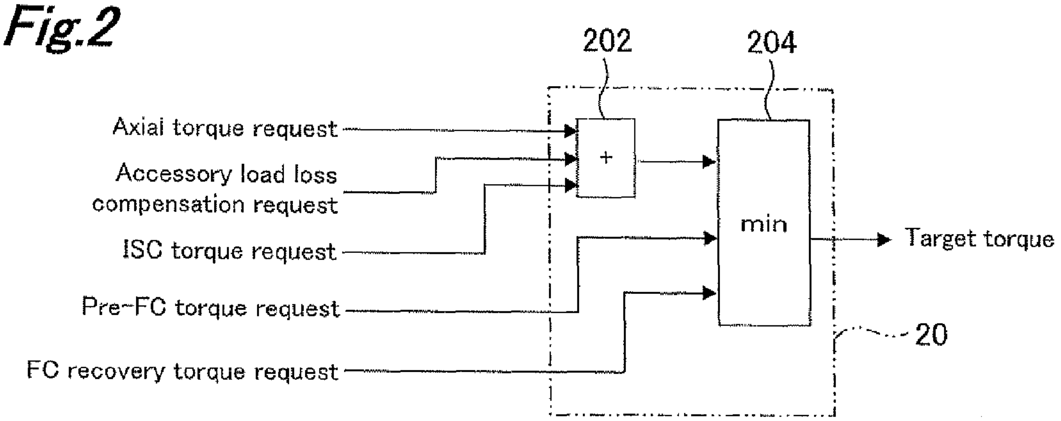
FIG. 2 is a block diagram illustrating the configuration of the torque mediation section according to the first embodiment of the present invention.

FIG. 2 is a block diagram illustrating the configuration of the torque mediation section 20. The torque mediation section 20 includes a summing element 202 and a minimum value selection element 204. In the present embodiment, the torque requests collected by the torque mediation section 20 are an axial torque request including a request from the driver, an accessory load loss compensation request, an ISC torque request, a pre-FC torque request, and an FC recovery torque request. The axial torque request, accessory load loss compensation request, and ISC torque request, which are counted as request values collected by the torque mediation section 20, are superposed upon each other by the summing element 202. An output value generated from the summing element 202 corresponds to the sum of output torques that consumption elements, which consume the torque of the engine, request the engine to generate. The output value of the summing element 202 enters the minimum value selection element 204 together with the pre-FC torque request and FC recovery torque. The minimum value selection element 204 selects the minimum value among the entered values. The selected value is then output from the torque mediation section 20 as a final torque request value, that is, the target torque of the engine. The same process as described above is also performed in the efficiency mediation section 22 although it is not described in detail here.

The controlled variable calculation section 6 will now be described. The request mediation section 4 supplies the target torque and target efficiency to the controlled variable calculation section 6. The information supply section 2 also supplies various information to the controlled variable calculation section 6. The information supplied from the information supply section 2 to the controlled variable calculation section 6 mainly includes an estimated torque at MBT, pre-FC control execution flag, FC recovery control execution flag, and FC execution flag. In accordance with the supplied information, the controlled variable calculation section 6 calculates a target throttle opening and target ignition timing, which are controlled variables for the actuators.

To determine a target throttle opening, the controlled variable calculation section 6 includes a target torque correction section 30, a target air amount calculation section 32, and a throttle opening calculation section 34. First of all, the target torque and target efficiency enter the target torque correction section 30. The target torque correction section 30 corrects the target torque by dividing it by the target efficiency, and outputs the corrected target torque to the target air amount calculation section 32. When the target efficiency is 1, which is a normal value, the target torque output from the torque mediation section 20 is output to the target air amount calculation section 32 as is. However, if the target efficiency is lower than 1, the target torque is increased by performing division with the target efficiency, and the increased target torque is output to the target air amount calculation section 32.

The target air amount calculation section 32 converts the corrected target torque to an air amount by using an air amount map. The air amount map is a multidimensional map based on a plurality of parameters such as the corrected target torque. The ignition timing, engine rotation speed, air-fuel ratio, valve timing, and various other operating conditions having influence on torque can be set as the parameters. Values (current values) derived from the current operating status information are input as the parameters. However, it is assumed that the ignition timing is adjusted for MBT or reference ignition timing. The target air amount calculation section 32 regards the air amount, which is obtained through conversion from the corrected target torque, as a target air amount for the engine, and outputs it to the throttle opening calculation section 34.

The throttle opening calculation section 34 converts the target air amount to a throttle opening by using an inverse model derived from the air intake system's air model. In other words, the throttle opening calculation section 34 calculates a throttle opening that can achieve the target air amount. For the inverse model, the air flow meter output value, valve timing, intake air temperature, and other operation conditions having influence on throttle opening can be set as parameters. Values (current values) derived from the current operating status information are input as the parameters. The throttle opening calculation section 34 outputs the calculated throttle opening, which is obtained through conversion from the target air amount, as a target throttle opening.

The controlled variable calculation section 6 also includes a torque efficiency calculation section 36, an upper/lower limit guard section 38, a retardation amount calculation section 40, an MBT calculation section 42, and an ignition timing calculation section 44 in order to determine target ignition timing. A target torque and an estimated torque enter the torque efficiency calculation section 36. The torque efficiency calculation section 36 calculates the ratio between the target torque and the estimated torque as torque efficiency. In a transient state where the air amount varies, the estimated torque varies with the air amount; therefore, the torque efficiency varies accordingly. The torque efficiency calculation section 36 outputs the calculated torque efficiency to the upper/lower limit guard section 38.

The upper/lower limit guard section 38 uses upper-limit torque efficiency and lower-limit torque efficiency to perform a guard process on the torque efficiency calculated by the torque efficiency calculation section 36. The upper-limit torque efficiency is a critical torque efficiency at which knocking can be certainly avoided. The lower-limit torque efficiency is a critical torque efficiency at which the combustion in the engine can be certainly maintained, that is, misfiring can be certainly avoided. The guard provided by the lower-limit torque efficiency is called a combustion limit guard. The critical torque efficiencies are both set in accordance with the information about the operating status of the engine such as the air-fuel ratio, engine rotation speed, and valve timing.

However, the combustion limit guard provided by the lower-limit torque efficiency is relieved when a predetermined condition is satisfied. More specifically, the combustion limit guard based on the lower-limit torque efficiency is relieved when the pre-FC control execution flag is on or when the FC recovery control execution flag is on. In other words, while later-described pre-FC control or FC recovery control is exercised, the torque efficiency can be decreased below the lower-limit torque efficiency. When the torque efficiency is lower than the lower-limit torque efficiency, the torque can be decreased below the combustion limit although the possibility of misfiring increases.

The torque efficiency on which the upper/lower limit guard section 38 has performed the guard process enters the retardation amount calculation section 40. The retardation amount calculation section 40 calculates the amount of retardation from MBT in accordance with the torque efficiency. An ignition timing map is used for retardation amount calculation. The ignition timing map is a multidimensional map based on a plurality of parameters such as torque efficiency. The engine rotation speed and various other operating conditions having influence on ignition timing determination can be set as the parameters. Values (current values) derived from the current operating status information are input as the parameters. The ignition timing map is prepared so that the setting for the retardation amount increases with a decrease in the torque efficiency.

In parallel with the calculation in the retardation amount calculation section 40, the MBT calculation section 42 calculates an MBT in accordance with an anticipated air amount provided by the current throttle opening. The ignition timing calculation section 44 adds the retardation amount calculated by the retardation amount calculation section 40 to the MBT calculated by the MBT calculation section 42, and outputs the calculation result as target ignition timing. When the torque efficiency is guarded by the aforementioned lower-limit torque efficiency, the target ignition timing is guarded by the retardation limit of the ignition timing range where combustion is maintainable. However, when the combustion limit guard based on the lower-limit torque efficiency is relieved, retardation may take place beyond the retardation limit.

The actuator control section 8 includes a throttle driver 50, an ignition device driver 52, and a fuel supply device driver 54. The throttle driver 50 controls the throttle so as to achieve the target throttle opening calculated by the throttle opening calculation section 34. The ignition device driver 52 controls the ignition device so as to achieve the target ignition timing calculated by the ignition timing calculation section 44. A target fuel supply amount (not shown) and the FC execution flag are supplied to the fuel supply device driver 54. The fuel supply device driver 54 controls the fuel supply device to achieve the target fuel supply amount when the FC execution flag is off, and controls the fuel supply device to shut off the supply of fuel when the FC execution flag is on. Control of the fuel supply amount will not be described in detail because it does not constitute an essential part of the present embodiment.

The configuration of the control device according to the present embodiment, which is described above, is such that the torque status prevailing before a fuel cut is determined by the timing at which the pre-FC control execution flag turns on, the setting for a pre-FC torque request value, and the timing at which the FC execution flag turns on. Further, the torque status prevailing upon recovery from a fuel cut is determined by the timing at which the FC recovery control execution flag status changes and the setting for an FC recovery torque request value. Pre-FC control and FC recovery control that are exercised by the control device according to the present embodiment will be sequentially described below.

Pre-FC control exercised by the control device according to the present embodiment will now be described in detail. Pre-FC control assumes that fuel cut permission conditions are satisfied when both of the following conditions are right. When the fuel cut permission conditions are satisfied, the status of the pre-FC control execution flag changes from off to on.

Condition 1: The torque indicated by the axial torque request including a request from the driver is zero.

Condition 2: The current engine rotation speed is higher than a predetermined rotation speed.

When condition 1 is right, torque reduction for a fuel cut can be initiated as early as possible without affecting drivability. This makes it possible to perform a fuel cut promptly and reduce extra fuel consumption accordingly. On the other hand, condition 2 represents the condition for preventing the engine from stalling due to a fuel cut. Therefore, the above-mentioned predetermined rotation speed varies depending on whether or not an automatic transmission is locked up.

Figure 3:
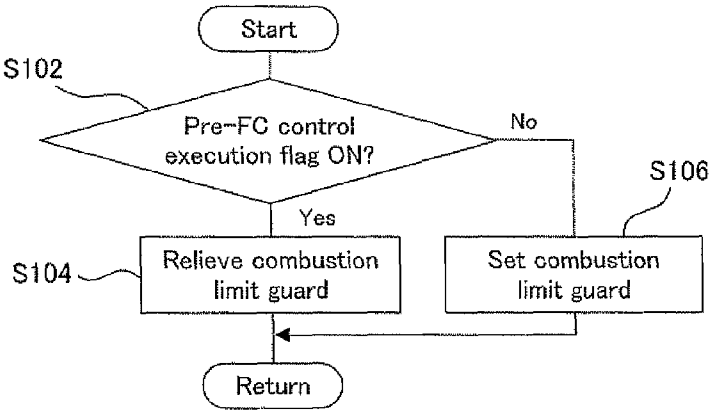
FIG. 3 is a flowchart illustrating a procedure for the combustion limit guard relieving/setting during pre-FC control according to the first embodiment of the present invention.

The on/off status of the pre-FC control execution flag is reflected in the operation of the upper/lower limit guard section 38. FIG. 3 is a flowchart illustrating a procedure for relieving/setting the combustion limit guard during pre-FC control. First of all, step S102 is performed to judge whether the pre-FC control execution flag is on or off. If the pre-FC control execution flag is on, step S104 is performed to relieve the combustion limit guard. If, on the other hand, the pre-FC control execution flag is off, step S106 is performed to set the combustion limit guard.

The on/off status of the pre-FC control execution flag is also reflected in the operation of the pre-FC torque request section 10. When the pre-FC control execution flag is off, the pre-FC torque request is fixed at a maximum value that can be output from the pre-FC torque request section 10. The maximum value is a value outside the range of torque that can be provided by the engine. When such a value is output as a request value, the minimum value selection element 204 of the torque mediation section 20 always selects the output value of the summing element 202.

When, on the other hand, the pre-FC control execution flag is on, the pre-FC torque request section 10 calculates a pre-FC torque request value in accordance with Equation 1 below. The minimum torque indicated in Equation 1 is a minimum torque that can be output from the engine, and is expressed by a function of engine rotation speed. The last torque request value indicated in Equation 1 is a torque request value determined by the last mediation, that is, the last target torque. The control device for the engine repeatedly performs a calculation process at regular intervals and calculates the target torque at the same regular intervals. The value "en" in Equation 1 is a constant, which is determined on the basis of fitness.

$$\text{Pre-FC torque request value}=(\text{minimum torque}-\text{last torque request value})/en\ \text{last torque request value} \quad \text{Equation 1}$$

Figure 4:
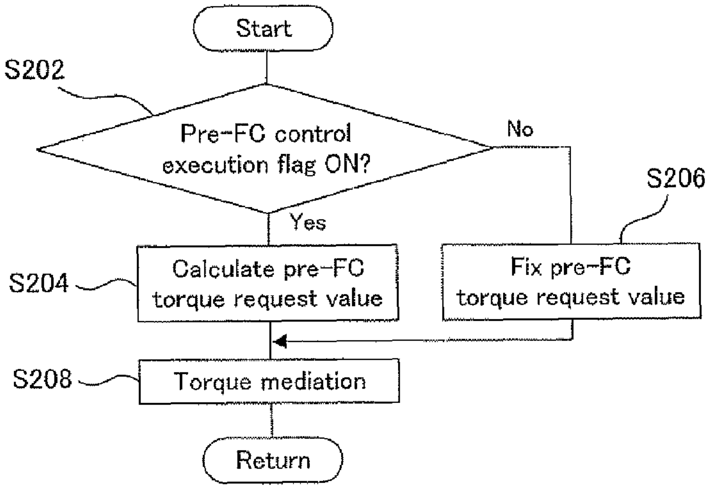
FIG. 4 is a flowchart illustrating a procedure for the target torque setting during pre-FC control according to the first embodiment of the present invention.

When the setting for the pre-FC torque request changes in accordance with the on/off status of the pre-FC control execution flag, the on/off status of the pre-FC control execution flag is reflected in the target torque to be output from the torque mediation section 20. FIG. 4 is a flowchart illustrating a procedure for setting the target torque during pre-FC control. First of all, step S202 is performed to judge whether the pre-FC control execution flag is on or off. If the pre-FC control execution flag is off, step S206 is performed to fix the pre-FC torque request at the maximum value. In the next step (step S208), therefore, torque mediation is performed so that the output value of the summing element 202 of the torque mediation section 20 is output as the target torque. If, on the other hand, the pre-FC control execution flag is on, step S204 is performed to calculate the pre-FC torque request value in accordance with Equation 1 above. The pre-FC torque request value calculated from Equation 1 is smaller than the output value of the summing element 202, that is, the sum of an axial torque request value, accessory load loss compensation request value, and ISC torque request value. In the next step (step S208), therefore, torque mediation is performed so as to output the pre-FC torque request value as the target torque.

Figure 6:
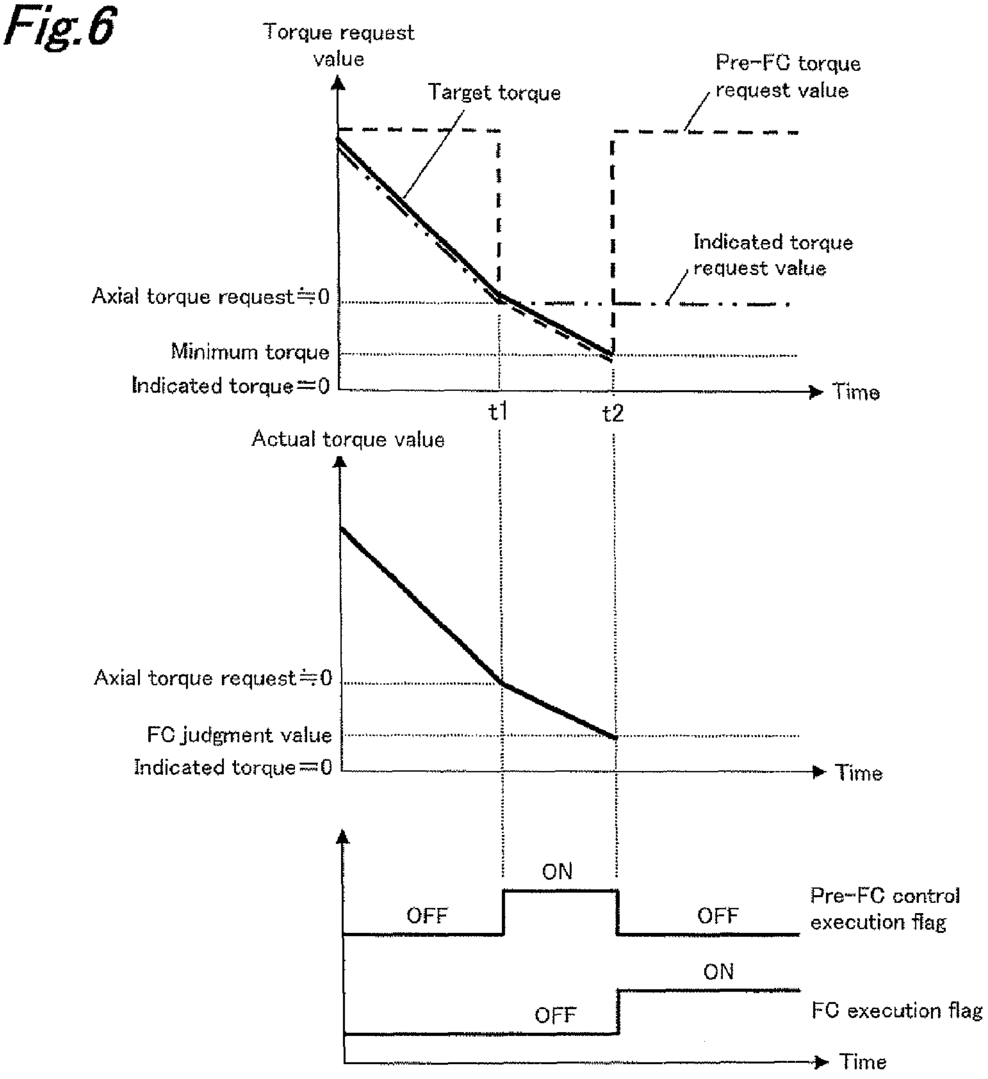
FIG. 6 is a timing diagram illustrating typical results of pre-FC control according to the first embodiment of the present invention.

FIG. 6 is a timing diagram illustrating typical results of pre-FC control. The upper chart shows temporal changes in the pre-FC torque request value (broken line in the figure), temporal changes in an indicated torque request value (two-dot chain line in the figure), and temporal changes in the target torque determined by mediation between the above two values (solid line in the figure). The above-mentioned indicated torque request value is the sum of the axial torque request value, accessory load loss compensation request value, and ISC torque request value. The middle chart shows temporal changes in an actual torque value that can be calculated from the current throttle opening and ignition timing. The lower chart shows temporal changes in the on/off status of the pre-FC control execution flag and FC execution flag. The above charts are drawn on the same temporal axis.

The timing diagram shown in FIG. 6 shows the results of pre-FC control that is exercised while an accelerator pedal is gradually released by the driver. In such an instance, the axial torque request value for the engine gradually decreases while the accelerator pedal is gradually released. Before long, the axial torque request value included in the indicated torque request value decreases to zero. Before the axial torque request value is decreased to zero, the pre-FC control execution flag is off. Therefore, the pre-FC torque request value remains maximized while the pre-FC control execution flag is off. Then, as a result of mediation, the indicated torque request value is output as the target torque.

When the axial torque request value is decreased to zero at time t1, the pre-FC control execution flag immediately turns on. When the pre-FC control execution flag turns on, the pre-FC torque request value is calculated from Equation 1 above. After the accelerator pedal is fully released, the axial torque request value for the engine is fixed at zero. The pre-FC torque request value calculated from Equation 1 is smaller than the indicated torque request value prevailing when the axial torque request value is zero. Therefore, the pre-FC torque request value is output as the target torque as a result of mediation.

According to Equation 1, the pre-FC torque request value gradually decreases to the minimum torque from the indicated torque request value prevailing at time t1 (that is, when the axial torque request value is zero). This causes the target torque to decrease to the minimum torque as well. The throttle opening is then adjusted to achieve the decreased target torque. However, when the torque is adjusted in accordance with the intake air amount, the adjustment is made with a response delay. In addition, a lower limit is imposed on torque that can be achieved by the intake air amount. Therefore, when the target torque decreases, it cannot readily be achieved simply by adjusting the throttle opening.

As the control device according to the present embodiment is configured as shown in FIG. 1, it automatically retards the ignition timing so as to compensate for the difference between the target torque and the torque achievable by the intake air amount. Under normal conditions, the ignition timing is guarded by the retardation limit. However, the combustion limit guard provided by the upper/lower limit guard section 38 becomes relieved when the pre-FC control execution flag turns on. Therefore, if necessary, the ignition timing can be retarded beyond the retardation limit. When the ignition timing is retarded beyond the retardation limit, the output torque of the engine can be decreased below the combustion limit. This ensures that the output torque follows the target torque until the minimum torque available from the engine is reached.

After the combustion limit guard is relieved, a misfire may occur because the ignition timing is retarded beyond the retardation limit. However, the output torque is sufficiently suppressed at the time of misfiring. Therefore, even if a misfire occurs, the resulting torque change does not cause a significant shock. Further, the combustion limit guard becomes relieved after the pre-FC control execution flag turns on. During a normal operation, therefore, the guard provided by the combustion limit ensures that the combustion in the engine is properly maintained.

Figure 5:
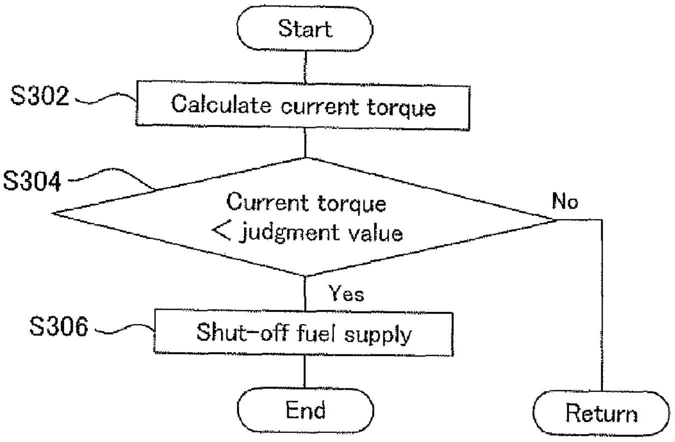
FIG. 5 is a flowchart illustrating a procedure for fuel shut-off during pre-FC control according to the first embodiment of the present invention.

When the output torque of the engine follows the target torque and decreases to the minimum torque (at time t2), a fuel cut is performed. FIG. 5 is a flowchart illustrating a procedure for shutting off the supply of fuel during pre-FC control. First of all, step S302 is performed to calculate a torque that is currently output from the engine. The torque actually output from the engine can be accurately calculated by using information, for instance, about the engine rotation speed, intake air amount, throttle opening, air-fuel ratio, valve timing, and ignition timing. Next, step S304 is performed to judge whether the current output torque is lower than an FC judgment value. The FC judgment value represents the minimum torque of the engine. When the output torque of the engine decreases to the minimum torque at time t2, the FC execution flag immediately turns on. When the FC execution flag turns on, step S306 is performed to shut off the supply of fuel.

As described above, the control device according to the present embodiment exercises pre-FC control so as to decrease the engine's output torque to the minimum torque before a fuel cut. When the supply of fuel is shut off after decreasing the engine's output torque to the minimum torque, it is possible to suppress the generation of torque-change-induced shock. Further, it is possible to avoid an abrupt torque change, which may be caused by pre-FC control, by gradually decreasing the engine's output torque to the minimum torque from the indicated torque request value prevailing when the pre-FC control execution flag turns on (that is, the axial torque request value is zero).

Figure 7:
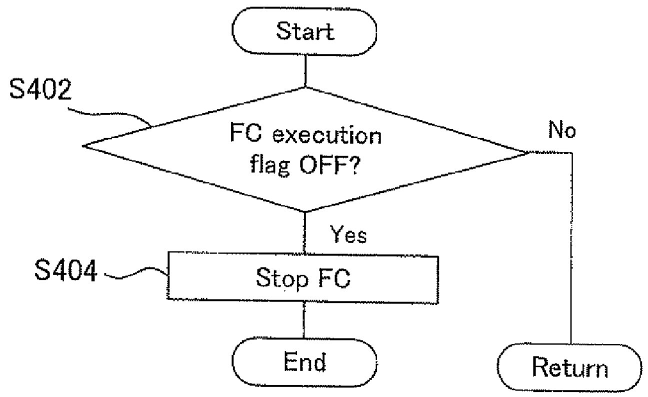
FIG. 7 is a flowchart illustrating a procedure of FC recovery judgment during FC recovery control according to the first embodiment of the present invention.

FC recovery control provided by the control device according to the present embodiment will now be described in detail. FIG. 7 is a flowchart illustrating a procedure that is performed during FC recovery control to judge whether recovery from a fuel cut is achieved. First of all, step S402 is performed to judge whether conditions for recovery from a fuel cut are satisfied. The conditions for recovery from a fuel cut are judged to be satisfied when the status of the aforementioned FC execution flag changes from on to off. When the conditions for recovery from a fuel cut are satisfied, step S404 is performed to stop the fuel cut and resume an engine operation.

FC recovery control is exercised so that the status of the FC execution flag changes from on to off when either of the following two conditions is right during a fuel cut. Further, the status of the FC recovery control execution flag changes from off to on when the FC execution flag turns off as described above.

Condition 1: An axial torque request including a request from the driver is generated.

Condition 2: The lock-up feature is deactivated.

Whether or not condition 1 is right is determined by judging whether the axial torque request value is greater than zero. When condition 1 is right, the fuel cut stops to let the engine generate torque and allow the engine's output torque to increase in compliance with a driver's request. Whether or not condition 2 is right is determined by judging whether a lock-up signal from the automatic transmission is on or off. When the lock-up feature is deactivated, a drive system's inertia force acting on the engine decreases, thereby drastically decreasing the engine rotation speed. Therefore, when condition 2 is right, the fuel cut is stopped to idle the engine.

Figure 8:
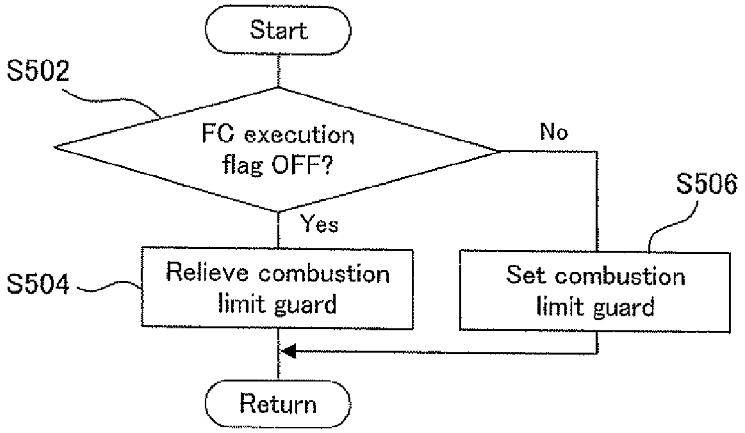
FIG. 8 is a flowchart illustrating a procedure for the combustion limit guard relieving/setting during FC recovery control according to the first embodiment of the present invention.

The on/off status of the FC recovery control execution flag is reflected in the operation of the upper/lower limit guard section 38. FIG. 8 is a flowchart illustrating a procedure for relieving/setting the combustion limit guard during FC recovery control. First of all, step S502 is performed to judge whether the FC recovery control execution flag is on or off. When the FC recovery control execution flag is on, step S504 is performed to relieve the combustion limit guard. When, on the other hand, the FC recovery control execution flag is off, step S506 is performed to set the combustion limit guard.

The on/off status of the FC recovery control execution flag is also reflected in the operation of the FC recovery torque request section 12. When the FC recovery control execution flag is off, the FC recovery torque request value is fixed at a maximum value that can be output from the FC recovery torque request section 12. The maximum value is a value outside the range of torque that can be provided by the engine. When such a value is output as a request value, the minimum value selection element 204 of the torque mediation section 20 always selects the output value of the summing element 202.

When, on the other hand, the FC recovery control execution flag is on, the FC recovery torque request section 12 calculates the FC recovery torque request value from Equation 2 or 3 below. Equation 2 is used to calculate an FC recovery torque request value that is to be set initially, that is, immediately after the FC recovery control execution flag turns on. The predetermined torque indicated in Equation 2 is the torque obtained by adding the accessory load loss compensation request value and ISC torque request value to the axial torque request value, which includes a driver's request. In other words, it is equivalent to the output value of the summing element 202 of the torque mediation section 20. β is a coefficient. This coefficient is set so that the value obtained by multiplying the predetermined torque by β is close to the minimum torque of the engine (more specifically, close to zero, or for example, 0.1).

$$FC \text{ recovery torque request value} = \text{predetermined torque} \times \beta \quad \text{Equation 2}$$

The FC recovery torque request section 12 uses Equation 3 to calculate the second or subsequent FC recovery torque request value. The last torque request value in Equation 3 is a torque request value determined by the last mediation, that is, the last target torque. The value "en" in Equation 3 is a constant, which is determined on the basis of fitness. The predetermined torque indicated in Equation 3 is the output value of the summing element 202 of the torque mediation section 20 as is the case with Equation 2, and is updated each time.

$$FC \text{ recovery torque request value} = (\text{predetermined torque} - \text{last torque request value})/en \text{ last torque request value} \quad \text{Equation 3}$$

Figure 9:
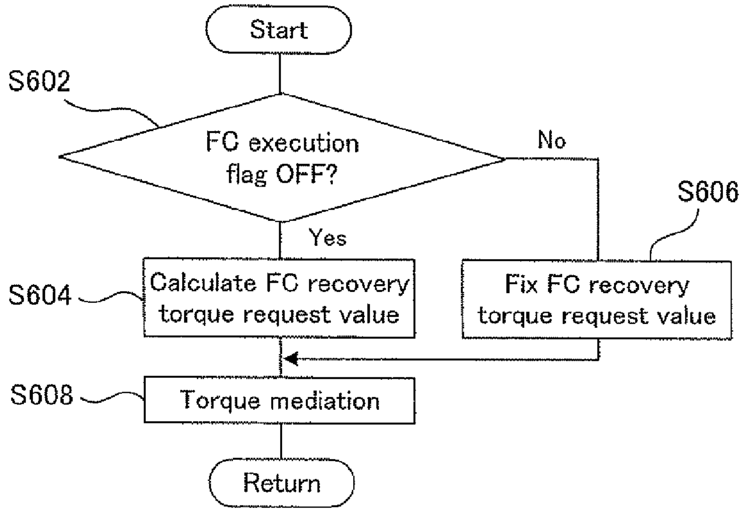
FIG. 9 is a flowchart illustrating a procedure for the target torque setting during FC recovery control according to the first embodiment of the present invention.

As the setting for the FC recovery torque request changes in accordance with the on/off status of the FC recovery control execution flag, the on/off status of the FC recovery control execution flag is reflected in the target torque output from the torque mediation section 20. FIG. 9 is a flowchart illustrating a procedure for setting the target torque during FC recovery control. First of all, step S602 is performed to judge whether the FC recovery control execution flag is on or off. When the FC recovery control execution flag is on, step S604 is performed to calculate the FC recovery torque request value from Equation 2 or 3 above. The FC recovery torque request value calculated from Equations 2 and 3 is smaller than the output value of the summing element 202 of the torque mediation section 20. In the next step (step S608), therefore, the pre-FC torque request value is output as the target torque as a result of torque mediation. When, on the other hand, the FC recovery control execution flag is off, step S606 is performed to fix the FC recovery torque request value at the maximum value. In the next step (step S608), therefore, the output value of the summing element 202 of the torque mediation section 20, that is, the sum of the axial torque request value, accessory load loss compensation request value, and ISC torque request value, is output as the target torque as a result of torque mediation.

Figure 11:
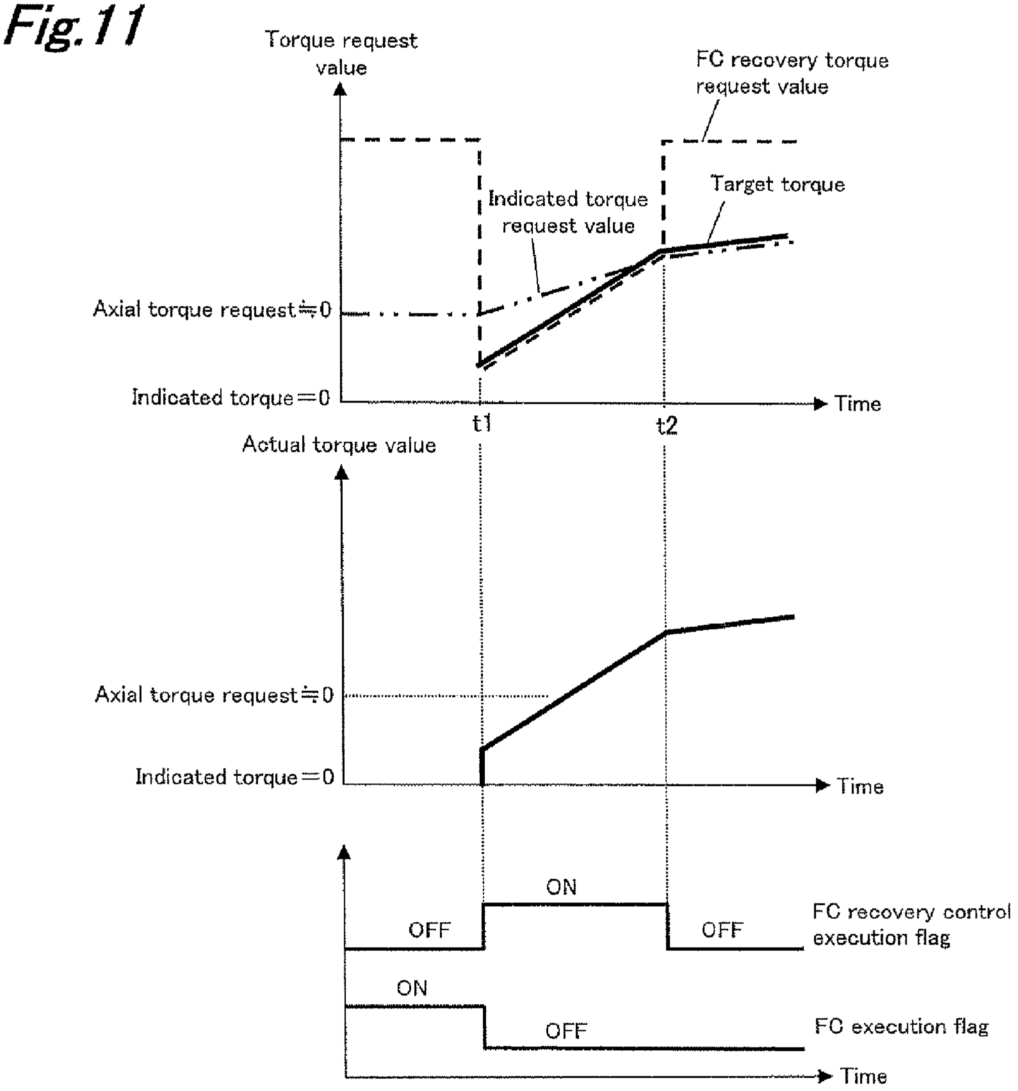
FIG. 11 is a timing diagram illustrating typical results of FC recovery control according to the first embodiment of the present invention.

FIG. 11 is a timing diagram illustrating typical results of FC recovery control. The upper chart shows temporal changes in the pre-FC torque request value (broken line in the figure), temporal changes in the indicated torque request value (two-dot chain line in the figure), and temporal changes in the target torque determined by mediation between the above two values (solid line in the figure). The indicated torque request value shown in the figure is the sum of the axial torque request value, accessory load loss compensation request value, and ISC torque request value. The middle chart shows temporal changes in an actual torque value that can be calculated from the current throttle opening and ignition timing. The lower chart shows temporal changes in the on/off status of the FC recovery control execution flag and FC execution flag. The above charts are drawn on the same temporal axis.

The timing diagram shown in FIG. 11 shows the results of FC recovery control that is exercised when the driver steps on the accelerator pedal. When the accelerator pedal is depressed to increase the axial torque request value from zero at time t1, the FC execution flag immediately turns off. When the FC execution flag turns off, a fuel cut stops. The FC recovery control execution flag turns on at the same time the FC execution flag turns off. Equation 2 above is used for the first calculation of the FC recovery torque request value after the FC recovery control execution flag is on. However, Equation 3 is used for the subsequent calculations of the FC recovery torque request value. Since the FC recovery torque request value calculated from Equation 2 or 3 is smaller than the indicated torque request value, the FC recovery torque request value is output as the target torque as a result of mediation.

According to Equations 2 and 3, the FC recovery torque request value prevailing immediately after recovery from a fuel cut is set to be close to the minimum torque available from the engine. Therefore, the target torque is also set to be close to the minimum torque of the engine so that the throttle opening is adjusted to achieve the target torque. However, a lower limit is imposed on torque that can be achieved by the intake air amount. Therefore, the target torque cannot readily be achieved simply by adjusting the throttle opening before the target torque increases to a certain value.

As the control device according to the present embodiment is configured as shown in FIG. 1, it automatically retards the ignition timing so as to compensate for the difference between the target torque and the torque achievable by the intake air amount. In such a situation, the combustion limit guard provided by the upper/lower limit guard section 38 is relieved because the FC recovery control execution flag is on. Therefore, if necessary, the ignition timing can be retarded beyond the retardation limit. When the ignition timing is retarded beyond the retardation limit, the output torque of the engine can be decreased below the combustion limit. This makes it possible to increase the engine's output torque from a level close to the minimum torque available from the engine in accordance with the target torque.

A misfire may occur without the maintenance of combustion when the ignition timing is retarded beyond the retardation limit. However, recovery from a fuel cut is achieved while the output torque is sufficiently suppressed. Therefore, even if a misfire occurs, the resulting torque change does not cause a significant shock. Further, the combustion limit guard provided by the upper/lower limit guard section 38 becomes active upon completion of recovery from a fuel cut. Therefore, the combustion in the engine is properly maintained due to the guard provided by the combustion limit when a normal operation is performed upon recovery from a fuel cut.

Figure 10:
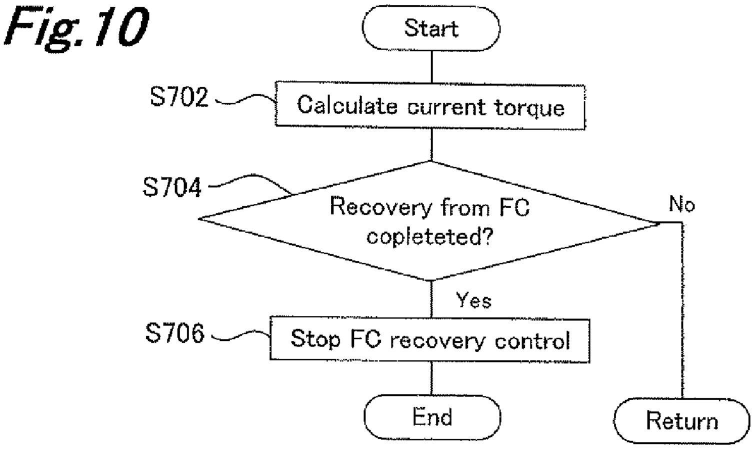
FIG. 10 is a flowchart illustrating a procedure of stop judgment of FC recovery control according to the first embodiment of the present invention.

When the engine's output torque follows the target torque and approaches the indicated torque request value (at time t2), FC recovery control comes to an immediate stop. FIG. 10 is a flowchart illustrating a procedure that is performed during FC recovery control to judge whether or not to stop exercising FC recovery control. First of all, step S702 is performed to calculate a torque that is currently output from the engine. Next, step S704 is performed to judge whether completion conditions for recovery from a fuel cut are satisfied. When the current output torque is greater than a completion judgment value, it is judged that the fuel cut recovery completion conditions are satisfied. The completion judgment value is a value slightly smaller than the indicated torque request value, that is, a value obtained by multiplying the indicated torque request value by a coefficient of 0.95. When the engine's output torque exceeds the completion judgment value at time t2, step S706 is immediately performed to turn off the FC recovery control execution flag. When the FC recovery control execution flag turns off, the FC recovery torque request value is fixed at the maximum value. Therefore, after time t2, the indicated torque request value is output as the target torque as a result of mediation.

As described above, FC recovery control according to the present embodiment is exercised to achieve recovery from a fuel cut in such a manner as to make the engine's output torque lower than the combustion limit. This makes it possible to reduce an abrupt torque change that occurs when torque is generated upon recovery from a fuel cut, and suppress the generation of torque-change-induced shock. Further, it is possible to avoid an abrupt torque change, which may result from discontinuation of FC recovery control, by gradually bringing the engine's output torque close to the indicated torque request value from a value below the combustion limit until the fuel cut recovery completion conditions are satisfied.

Further, when recovery from a fuel cut is to be achieved in accordance with a driver's axial torque request, the engine's output torque can be smoothly increased as needed to provide the axial torque requested by the driver without causing an abrupt torque change during such an output torque increase, as indicated by the timing diagram in FIG. 11. Similarly, even when recovery from a fuel cut is to be achieved by deactivating the lock-up feature, the engine's output torque can be smoothly increased as needed to provide torque necessary for idling the engine without causing an abrupt torque change during such an output torque increase, although no associated timing diagram is prepared for explanation purposes.

The engine control device according to the first embodiment of the present invention has been described above. The correlations between the first embodiment and the first aspect of the present invention are as described below.

The torque mediation section 20 and the pre-FC torque request section 10 constitute the "target torque setup means". More specifically, the summing element 202 of the torque mediation section 20 corresponds to the "requested output torque acquisition means"; the pre-FC torque request section 10 corresponds to the "pre-fuel-cut torque request means"; and the minimum value selection element 204 of the torque mediation section 20 corresponds to the "mediation means". The target air amount calculation section 32 and the throttle opening calculation section 34 correspond to the "intake air amount control means". The estimated torque calculation section 14 corresponds to the "estimated torque calculation means"; and the torque efficiency calculation section 36 corresponds to the "torque efficiency calculation means". The retardation amount calculation section 40 corresponds to the "ignition retardation amount setup means"; and the ignition timing calculation section 44 corresponds to the "ignition timing control means". All the above elements constitute the "torque control means".

The upper/lower limit guard section 38 corresponds to the "guard means". The flag set section 16 corresponds to the "judgment means". The "relief means" is implemented when the combustion limit guard provided by the upper/lower limit guard section 38 is relieved/set in accordance with the pre-FC control execution flag supplied from the flag set section 16. The "fuel supply shutoff means" is implemented when the fuel supply device driver 54 shuts off the supply of fuel in accordance with the FC execution flag supplied from the flag set section 16.

The correlations between the first embodiment and the second aspect of the present invention are as described below.

The torque mediation section 20 and the pre-FC torque request section 10 constitute the "target torque setup means". More specifically, the summing element 202 of the torque mediation section 20 corresponds to the "requested output torque acquisition means"; the FC recovery torque request section 12 corresponds to the "fuel-cut recovery torque request means"; and the minimum value selection element 204 of the torque mediation section 20 corresponds to the "mediation means". The target air amount calculation section 32 and the throttle opening calculation section 34 correspond to the "intake air amount control means". The estimated torque calculation section 14 corresponds to the "estimated torque calculation means"; and the torque efficiency calculation section 36 corresponds to the "torque efficiency calculation means". The retardation amount calculation section 40 corresponds to the "ignition retardation amount setup means"; and the ignition timing calculation section 44 corresponds to the "Ignition timing control means". All the above elements constitute the "torque control means".

The upper/lower limit guard section 38 corresponds to the "guard means". The flag set section 16 corresponds to the "judgment means". The "relief means" is implemented when the combustion limit guard provided by the upper/lower limit guard section 38 is relieved/set in accordance with the FC recovery control execution flag supplied from the flag set section 16.

Second Embodiment

A second embodiment of the present invention will now be described with reference to FIGS. 12 and 13. The control device according to the second embodiment includes a control circuit that has the same configuration as the counterpart of the first embodiment. Therefore, the subsequent description of the second embodiment is based on the configuration shown in FIGS. 1 and 2 as is the case with the first embodiment.

The control device according to the present embodiment differs from the control device according to the first embodiment in the procedure for shutting off the supply of fuel during pre-FC control. The first embodiment shuts off the supply of fuel when the engine's output torque is decreased to the minimum torque. However, since the control circuit and actuators vary from one unit to another, the result of torque control varies to a certain degree. If torque control variations affect the output torque during pre-FC control, the engine's output torque does not decrease to the minimum torque regardless of ignition timing retardation. This prevents a fuel cut from being initiated.

Figure 12:
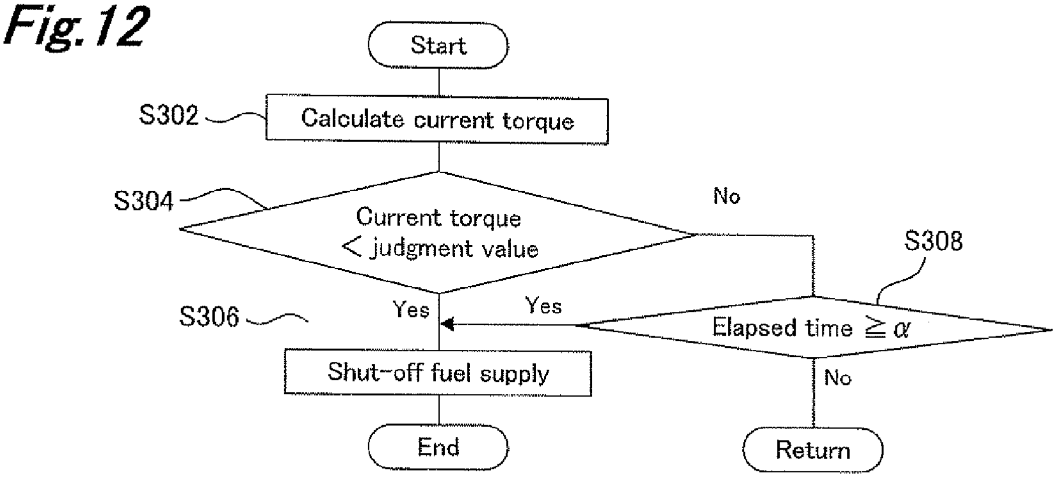
FIG. 12 is a flowchart illustrating a procedure for fuel shut-off during pre-FC control according to a second embodiment of the present invention.
Figure 13:
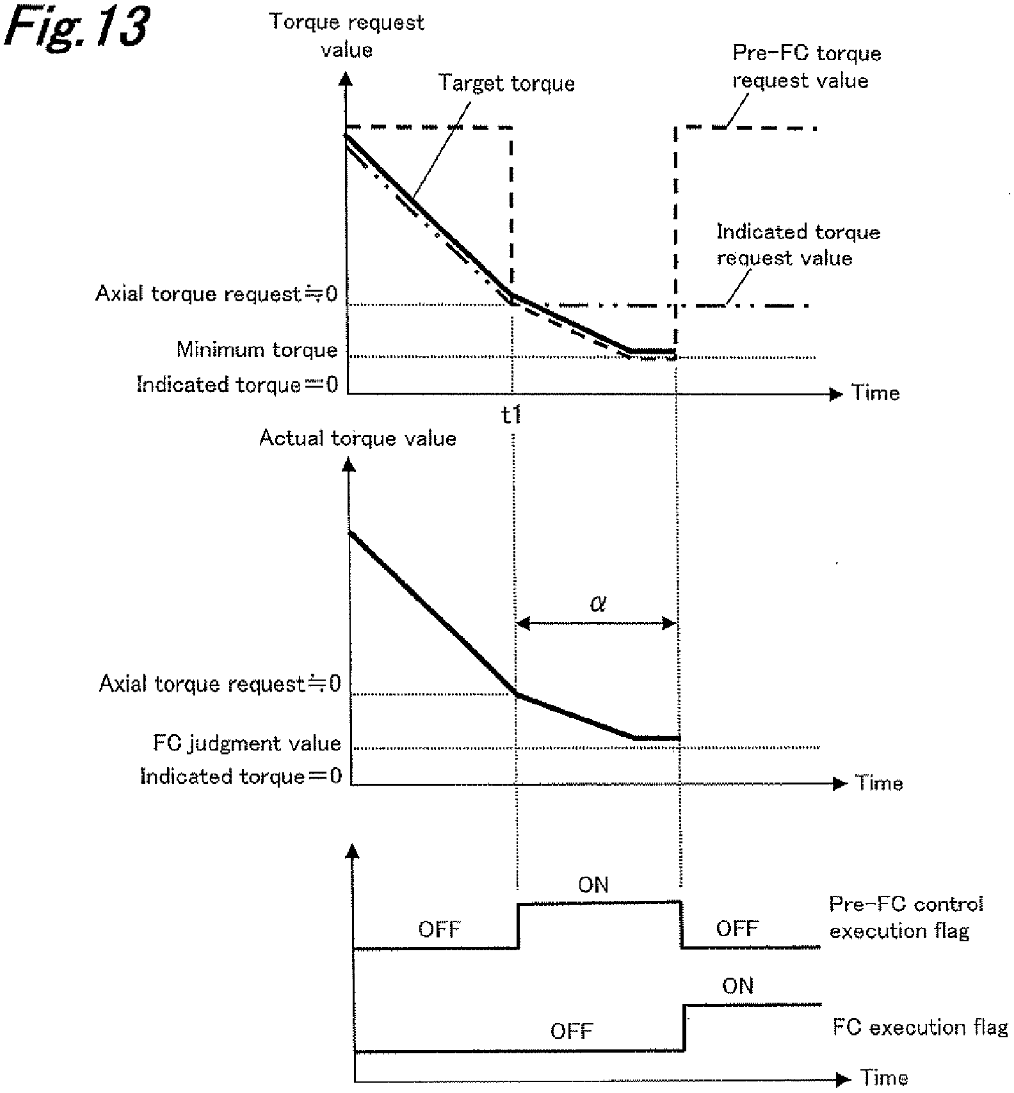
FIG. 13 is a timing diagram illustrating typical results of pre-FC control according to the second embodiment of the present invention.

In view of the above circumstances, a procedure shown in FIG. 12 is performed instead of the procedure shown in FIG. 10 to shut off the supply of fuel during pre-FC control according to the present embodiment. In a flowchart shown in FIG. 12, processing steps identical with those indicated in the flowchart in FIG. 10 are assigned the same step numbers as their counterparts. FIG. 13 is a timing diagram illustrating typical results of pre-FC control.

Referring to the flowchart in FIG. 12, the first step (step S302) is performed to calculate a torque that is currently output from the engine. The next step (step S304) is performed to judge whether the current output torque is lower than the FC judgment value, that is, the engine's minimum torque. When the engine's output torque is not decreased to the minimum torque, the present embodiment measures the elapsed time from the instant (time t1) at which the fuel cut permission conditions are satisfied to turn on the pre-FC control execution flag. Step S308 is then performed to judge whether the elapsed time has reached a predetermined time limit α.

The above time limit α is predetermined by adding some extra time to the theoretical time required for the engine's output torque to decrease to the minimum torque. If, as indicated by the timing diagram in FIG. 13, the engine's output torque does not decrease to the minimum torque even after the target torque is decreased to the minimum torque, the elapsed time reaches the time limit α before long. When the elapsed time reaches the time limit α, the present embodiment immediately turns on the FC execution flag. When the FC execution flag turns on, step S306 is performed to shut off the supply of fuel.

As described above, when the time limit α is reached by the elapsed time from the instant (time t1) at which the fuel cut permission conditions are satisfied, pre-FC control according to the present embodiment is exercised to forcibly shut off the supply of fuel. Therefore, a fuel cut can be properly performed even when the engine's output torque does not decrease to the minimum torque because of torque control variation. This makes it possible to enjoy the benefits of a fuel cut such as fuel efficiency enhancement and emissions performance improvement.

Other

While the present invention has been described in terms of embodiments, it should be understood that the invention is not limited to the embodiments described above, and that variations may be made without departure from the scope and spirit of the invention. For example, the control device according to the present invention can be implemented by using a control circuit that differs in configuration from the control circuit according to the foregoing embodiments. When a target torque is given, the control circuit according to the foregoing embodiments automatically adjusts the throttle opening and ignition timing in such a manner as to achieve the target torque. However, the present invention can also be implemented by using an alternative configuration that gives individual target values (target throttle opening and target ignition timing) to the actuators.

The invention claimed is:

1. An internal combustion engine control device comprising:

guard means for guarding the ignition timing by the retardation limit of a ignition timing range where the combustion in an internal combustion engine is maintainable;

judgment means for judging whether fuel cut permission conditions are satisfied;

relief means for relieving the ignition timing guard provided by the guard means when the fuel cut permission conditions are satisfied;

torque control means for reducing the output torque of the internal combustion engine by retarding the ignition timing after the fuel cut permission conditions are satisfied; and fuel supply shutoff means for shutting off the supply of fuel after the output torque of the internal combustion engine is reduced to a predefined minimum torque, wherein the torque control means includes:

target torque setup means, which serves as means for setting a target torque for the internal combustion engine and, after the fuel cut permission conditions are satisfied, reduces the target torque to the minimum torque;

intake air amount control means for controlling the operation amount of an intake actuator, which adjusts the intake air amount of the internal combustion engine, in accordance with the target torque;

estimated torque calculation means for calculating an estimated torque that is obtained when the ignition timing is adjusted for MBT without changing the current operation amount of the intake actuator;

torque efficiency calculation means for calculating torque efficiency from the ratio between the target torque and the estimated torque;

ignition retardation amount setup means for setting a retardation amount for the ignition timing in accordance with the torque efficiency; and ignition timing control means for controlling the ignition timing in accordance with the retardation amount; and wherein the target torque setup means includes:

requested output torque acquisition means for acquiring an output torque that a consumption element, which consumes the torque of the internal combustion engine, requests the internal combustion engine to generate;

pre-fuel-cut torque request means, which serves as request means for expressing a request concerning a pre-fuel-cut operating state in terms of a torque value, requests a value beyond an achievable torque range as a pre-fuel-cut torque when the fuel cut permission conditions are not satisfied, and gradually reduces the pre-fuel-cut torque from an output torque requested when the fuel cut permission conditions are satisfied to the minimum torque after the fuel cut permission conditions are satisfied; and mediation means for comparing the requested output torque and the pre-fuel-cut torque and selecting the lower of the two torques as a target torque.

2. The internal combustion engine control device according to claim 1, wherein the requested output torque acquisition means acquires the sum of an axial torque requested by a driver and an accessory load torque necessary for accessory drive as the requested output torque.

3. The internal combustion engine control device according to claim 2, wherein, when the value of the axial torque requested by the driver is zero, the judgment means judges that the fuel cut permission conditions are satisfied.

4. The internal combustion engine control device according to claim 1, wherein the fuel supply shutoff means measures the elapsed time from the instant at which the fuel cut permission conditions are satisfied, and when the elapsed time reaches a predetermined time limit, shuts off the supply of fuel even if the output torque of the internal combustion engine is not reduced to the minimum torque.

5. An internal combustion engine control device comprising:

guard means for guarding the ignition timing by the retardation limit of a ignition timing range where the combustion in an internal combustion engine is maintainable;

torque control means which, when recovery from a fuel-cut state is to be achieved, retards the ignition timing to reduce the output torque of the internal combustion engine;

judgment means for judging whether completion conditions for recovery from the fuel cut state are satisfied; and relief means for relieving the ignition timing guard provided by the guard means until the fuel cut recovery completion conditions are satisfied, wherein the torque control means includes:

target torque setup means, which serves as means for setting a target torque for the internal combustion engine and, when recovery from a fuel-cut state is to be achieved, gradually increases the target torque from a value below a combustion limit;

intake air amount control means for controlling the operation amount of an intake actuator, which adjusts the intake air amount of the internal combustion engine, in accordance with the target torque;

estimated torque calculation means for calculating an estimated torque that is obtained when the ignition timing is adjusted for MBT without changing the current operation amount of the intake actuator;

torque efficiency calculation means for calculating torque efficiency from the ratio between the target torque and the estimated torque;

ignition retardation amount setup means for setting a retardation amount for the ignition timing in accordance with the torque efficiency; and ignition timing control means for controlling the ignition timing in accordance with the retardation amount; and wherein the target torque setup means includes:

requested output torque acquisition means for acquiring an output torque that a consumption element, which consumes the torque of the internal combustion engine, requests the internal combustion engine to generate;

fuel-cut recovery torque request means, which serves as request means for expressing a request concerning an operating state prevailing upon recovery from a fuel-cut state in terms of a torque value, requests a value beyond an achievable torque range as a fuel-cut recovery torque when the fuel cut recovery completion conditions are satisfied, and gradually brings the fuel-cut recovery torque close to the requested output torque from a value below the combustion limit until the fuel cut recovery completion conditions are satisfied; and mediation means for comparing the requested output torque and the fuel-cut recovery torque and selecting the lower of the two torques as a target torque.

6. The internal combustion engine control device according to claim 5, wherein the requested output torque acquisition means acquires the sum of an axial torque requested by a driver and an accessory load torque necessary for accessory drive as the requested output torque.

7. The internal combustion engine control device according to claim 5, wherein the requested output torque acquisition means acquires a torque necessary for idling the internal combustion engine as the requested output torque.

8. The internal combustion engine control device according to claim 5, wherein, when the difference between the requested output torque and the fuel cut recovery torque is reduced to a predetermined value or smaller, the judgment means judges that the fuel cut recovery completion conditions are satisfied.

9. An internal combustion engine control device comprising:

a guard unit which guards the ignition timing by the retardation limit of a ignition timing range where the combustion in an internal combustion engine is maintainable;

a judgment unit which judges whether fuel cut permission conditions are satisfied;

a relief unit which relieves the ignition timing guard provided by the guard unit when the fuel cut permission conditions are satisfied;

a torque control unit which reduces the output torque of the internal combustion engine by retarding the ignition timing after the fuel cut permission conditions are satisfied; and a fuel supply shutoff unit which shuts off the supply of fuel after the output torque of the internal combustion engine is reduced to a predefined minimum torque, wherein the torque control unit includes:

a target torque setup unit, which serves as means for setting a target torque for the internal combustion engine and, after the fuel cut permission conditions are satisfied, reduces the target torque to the minimum torque;

an intake air amount control unit which controls the operation amount of an intake actuator, which adjusts the intake air amount of the internal combustion engine, in accordance with the target torque;

an estimated torque calculation unit which calculates an estimated torque that is obtained when the ignition timing is adjusted for MBT without changing the current operation amount of the intake actuator;

a torque efficiency calculation unit which calculates torque efficiency from the ratio between the target torque and the estimated torque;

an ignition retardation amount setup unit which sets a retardation amount for the ignition timing in accordance with the torque efficiency; and an ignition timing control unit which controls the ignition timing in accordance with the retardation amount; and wherein the target torque setup unit includes:

a requested output torque acquisition unit for acquiring an output torque that a consumption element, which consumes the torque of the internal combustion engine, requests the internal combustion engine to generate;

a pre-fuel-cut torque request unit, which serves as a request unit for expressing a request concerning a pre-fuel-cut operating state in terms of a torque value, requests a value beyond an achievable torque range as a pre-fuel-cut torque when the fuel cut permission conditions are not satisfied, and gradually reduces the pre-fuel-cut torque from an output torque requested when the fuel cut permission conditions are satisfied to the minimum torque after the fuel cut permission conditions are satisfied; and a mediation unit for comparing the requested output torque and the pre-fuel-cut torque and selecting the lower of the two torques as a target torque.

10. An internal combustion engine control device comprising:

a guard unit which guards the ignition timing by the retardation limit of a ignition timing range where the combustion in an internal combustion engine is maintainable;

a torque control unit which, when recovery from a fuel-cut state is to be achieved, retards the ignition timing to reduce the output torque of the internal combustion engine;

a judgment unit which judges whether completion conditions for recovery from the fuel cut state are satisfied; and a relief unit which relieves the ignition timing guard provided by the guard unit until the fuel cut recovery completion conditions are satisfied, wherein the torque control means includes:

a target torque setup unit, which serves as means for setting a target torque for the internal combustion engine and, when recovery from a fuel-cut state is to be achieved, gradually increases the target torque from a value below a combustion limit;

an intake air amount control unit which controls the operation amount of an intake actuator, which adjusts the intake air amount of the internal combustion engine, in accordance with the target torque;

an estimated torque calculation unit which calculates an estimated torque that is obtained when the ignition timing is adjusted for MBT without changing the current operation amount of the intake actuator;

a torque efficiency calculation unit which calculates torque efficiency from the ratio between the target torque and the estimated torque;

an ignition retardation amount setup unit which sets a retardation amount for the ignition timing in accordance with the torque efficiency; and an ignition timing control unit which controls the ignition timing in accordance with the retardation amount; and wherein the target torque setup unit includes:

a requested output torque acquisition unit for acquiring an output torque that a consumption element, which consumes the torque of the internal combustion engine, requests the internal combustion engine to generate;

a fuel-cut recovery torque request unit, which serves as a request unit for expressing a request concerning an operating state prevailing upon recovery from a fuel-cut state in terms of a torque value, requests a value beyond an achievable torque range as a fuel-cut recovery torque when the fuel cut recovery completion conditions are satisfied, and gradually brings the fuel-cut recovery torque close to the requested output torque from a value below the combustion limit until the fuel cut recovery completion conditions are satisfied; and mediation means for comparing the requested output torque and the fuel-cut recover torque and selecting the lower of the two torques as a target torque.

* * * * *